(12) United States Patent
Harris et al.

(10) Patent No.: US 9,634,694 B2
(45) Date of Patent: Apr. 25, 2017

(54) TRANSMITTER WITH A REDUCED COMPLEXITY DIGITAL UP-CONVERTER

(71) Applicant: Avago Technologies General IP (Singapore) Pte. Ltd., Irvine, CA (US)

(72) Inventors: David Money Harris, Upland, CA (US); David Garrett, Tustin, CA (US); Bob Lorenz, Menlo Park, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 228 days.

(21) Appl. No.: 14/163,783

(22) Filed: Jan. 24, 2014

(65) Prior Publication Data
US 2015/0147987 A1 May 28, 2015

Related U.S. Application Data

(60) Provisional application No. 61/909,055, filed on Nov. 26, 2013.

(51) Int. Cl.
*H04B 1/04* (2006.01)
*H04B 1/66* (2006.01)
*H04B 1/02* (2006.01)
*H04B 1/00* (2006.01)

(52) U.S. Cl.
CPC .................................. *H04B 1/0007* (2013.01)

(58) Field of Classification Search
CPC H04B 1/04; H04B 2001/0491; H04B 1/0007; H04B 1/02; H04B 1/66
See application file for complete search history.

(56) References Cited

U.S. PATENT DOCUMENTS

| 4,295,105 | A | * | 10/1981 | Bingham | H03D 7/00 332/149 |
|---|---|---|---|---|---|
| 4,597,082 | A | * | 6/1986 | Hill | H04B 3/56 375/222 |
| 4,622,481 | A | * | 11/1986 | Nortrup | H03J 9/06 327/45 |
| 5,684,830 | A | * | 11/1997 | Ichikawa | H04B 1/10 375/254 |
| 6,317,468 | B1 | * | 11/2001 | Meyer | H03B 28/00 375/269 |
| 6,922,436 | B1 | * | 7/2005 | Porat | H03M 1/66 375/222 |

(Continued)

*Primary Examiner* — Pablo Tran
(74) *Attorney, Agent, or Firm* — Sterne, Kessler, Goldstein & Fox P.L.L.C.

(57) ABSTRACT

The present disclosure is directed to a system and method for performing digital up-conversion of a signal to a desired RF carrier frequency. The system and method efficiently perform digital up-conversion of the signal, in one example, by controlling a sample clock that is used by a DAC to sample and convert the up-converted signal from the digital domain to the analog domain to have a frequency that is four or eight times the desired RF carrier frequency. By controlling the sample clock of the DAC to have a frequency that is four or eight times the desired RF carrier frequency, the system and method can be implemented using currently available IC process geometries such that the implementation consumes much less area and/or power than an analog up-converter configured to have equivalent up-conversion functionality.

20 Claims, 9 Drawing Sheets

(56) References Cited

U.S. PATENT DOCUMENTS

| | | | | |
|---|---|---|---|---|
| 7,020,221 | B2* | 3/2006 | Glas | H04B 1/0003 |
| | | | | 375/316 |
| 7,061,989 | B2* | 6/2006 | Bellaouar | H03F 1/0205 |
| | | | | 330/264 |
| 7,224,717 | B1* | 5/2007 | Lam | H04B 7/084 |
| | | | | 375/144 |
| 7,602,862 | B2* | 10/2009 | May | H03D 3/007 |
| | | | | 375/322 |
| 7,924,937 | B2* | 4/2011 | Norsworthy | H03C 3/40 |
| | | | | 375/295 |
| 8,705,675 | B2* | 4/2014 | Lolis | H04B 1/0025 |
| | | | | 375/350 |
| 2004/0192229 | A1* | 9/2004 | Morris | H04B 1/0483 |
| | | | | 455/91 |

* cited by examiner

US 9,634,694 B2

TRANSMITTER WITH A REDUCED COMPLEXITY DIGITAL UP-CONVERTER

CROSS REFERENCE TO RELATED APPLICATIONS

This application claims the benefit of U.S. Provisional Patent Application No. 61/909,055, filed Nov. 26, 2013, which is incorporated by reference herein.

TECHNICAL FIELD

This application relates generally to digital up-converters, including radio frequency (RF) digital up-converters.

BACKGROUND

In a radio transmitter, the back-end is generally defined as the portion of the transmitter that sits between the digital baseband system and the antenna. The back-end includes an up-converter for up-converting a baseband signal received from the digital baseband system to a carrier frequency, a filter for filtering the up-converted signal, and a power amplifier for boosting the strength of the up-converted signal before it is transmitted by the antenna. In addition to the above mentioned components, the back-end includes a digital-to-analog converter (DAC) at some point before the antenna to convert the signal to be transmitted from a digital signal to an analog signal.

To take full advantage of continuing reductions in the size of integrated circuit (IC) process geometries, the DAC should be placed as close as possible to the antenna such that as many components as possible in the back-end can be implemented using digital circuitry. The reason being is that digital circuitry scales better in terms of cost and power with reductions in IC process geometries than analog circuitry. Although digital circuitry scales better, conventional digital implementations of many of the components in the back-end using currently available IC process geometries can still consume more area and/or power than their equivalent analog implementations, especially when operating at frequencies in the RF range. This can be a significant drawback for small, battery powered communication devices, such as mobile phones, laptops, tablets, smart watches, etc.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
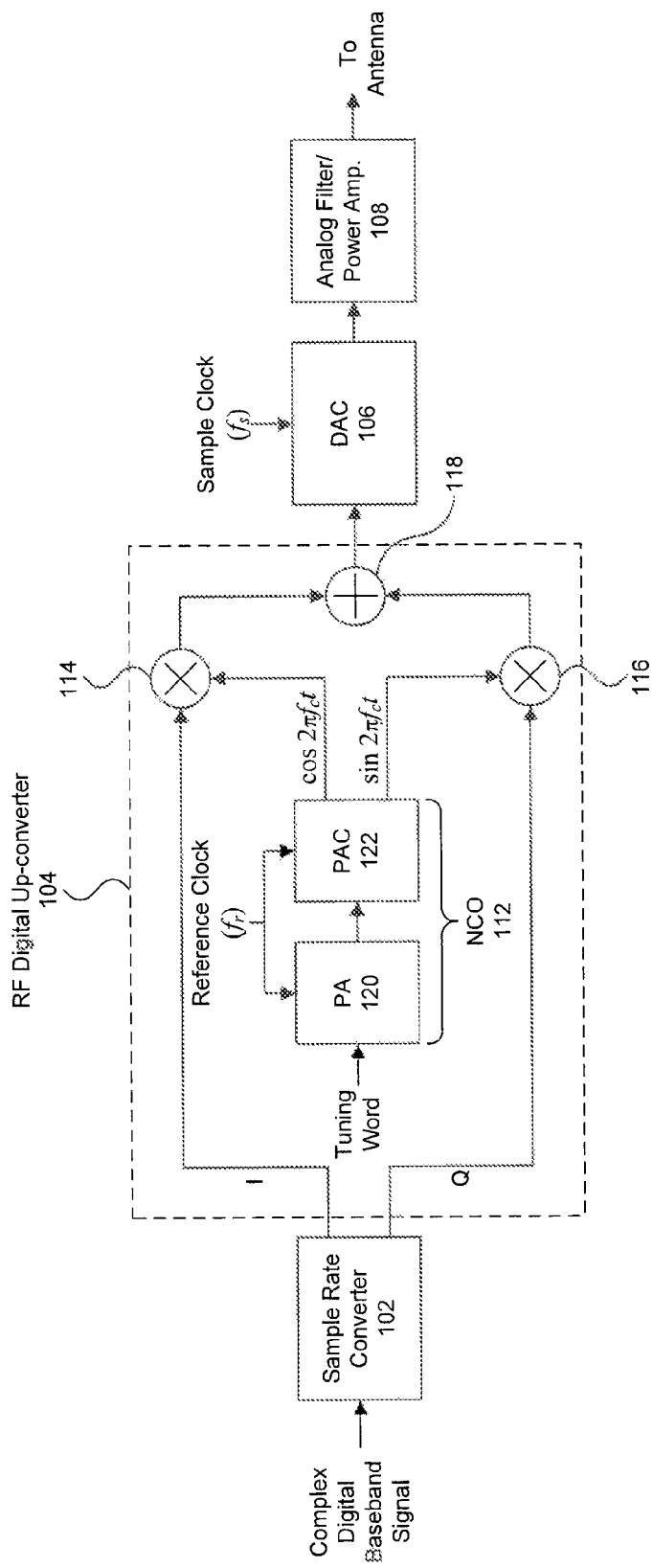
FIG. 1 illustrates a transmitter back-end with an RF digital up-converter.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

I. OVERVIEW

The present disclosure is directed to a system and method for performing digital up-conversion of a signal to a desired RF carrier frequency. In one embodiment, the system and method efficiently perform digital up-conversion by controlling a sample clock used by a DAC to sample and convert the up-converted signal from the digital domain to the analog domain to have a frequency that is four or eight times the desired RF carrier frequency. By controlling the sample clock of the DAC to have a frequency that is four or eight times the desired RF carrier frequency, the system and method can be implemented using currently available IC process geometries such that the implementation consumes less area and/or power than an analog up-converter configured to have equivalent up-conversion functionality. In the case where the sample clock cannot be generated to have a frequency that is close enough to four or eight times the desired RF carrier frequency, an IF digital up-converter can be used to frequency-shift the lower bandwidth baseband signal to pre-compensate for a offset due to the imperfect sample clock. Embodiments of a split rate RF digital up-converter are also described below.

II. QUARTER AND/OR EIGHTH RATE DIGITAL UP-CONVERSION

Before describing further aspects of the system and method of the present disclosure, it is instructive to first consider the transmitter back-end 100 illustrated in FIG. 1. Transmitter back-end 100 includes a sample rate converter 102, an RF digital up-converter 104, a digital-to-analog converter (DAC) 106, and an analog filter/power amplifier 108. In operation, transmitter back-end 100 is configured to receive data (e.g., voice, video, and/or internet traffic) as a complex digital baseband signal and process the complex digital baseband signal so that it can be transmitted over a channel.

Ignoring sample rate converter 102 for the moment, RF digital up-converter 104 is configured to up-convert the complex digital baseband signal to a desired RF carrier frequency $f_c$ using a numerically controlled oscillator (NCO) 112, a quadrature mixer formed by two digital multipliers 114 and 116, and a digital adder 118. The complex mixer specifically uses digital multiplier 114 to mix an in-phase component (I) of the complex digital baseband signal with a digital cosine wave that has a frequency equal to the desired RF carrier frequency $f_c$. Digital multiplier 114 provides, as output, the in-phase component at the desired RF carrier frequency $f_c$. Similarly, the complex mixer uses digital multiplier 116 to mix a quadrature component (Q) of the complex digital baseband signal with a digital sine wave that has a frequency equal to the desired RF carrier frequency $f_c$. Digital multiplier 116 provides, as output, the quadrature component at the desired RF carrier frequency $f_c$.

NCO 112 is configured to generate the digital cosine and sine waves (also referred to as carrier waves) at the frequency $f_c$ using a phase accumulator (PA) 120 and a phase-to-amplitude converter (PAC) 122. PA 120 includes a counter that is incremented with each cycle of a reference clock (or based on a reference clock) by an amount determined by a tuning word. The value of the counter represents a phase angle and is used to index into a cosine/sine look-up table in PAC 122. In response to receiving the counter value, the cosine/sine look-up table in PAC 122 outputs two digital amplitudes that respectively correspond to the cosine and sine of the phase angle represented by the received counter value. By setting the tuning word equal to $f_c/f_r$ (or a multiple thereof depending on the modulus of the counter in PA 120), where $f_r$ is the frequency of the reference clock, it can be shown that the output of PAC 122 will correspond to samples of the digital cosine and sine wave at the desired frequency $f_c$. The samples of the digital cosine and sine wave are typically provided by PAC 122 at the reference clock frequency $f_r$.

Because the digital cosine and sine waves provided by NCO 112 have the same frequency $f_c$ but are 90 degrees out of phase with each other, the up-converted components provided at the output of digital multipliers 114 and 116 can be combined into a single up-converted signal using digital adder 118 without the two up-converted components interfering with one another. The resulting up-converted signal can be written as:

$$I[t] \cdot \cos[2\pi f_c t] + Q[t] \cdot \sin[2\pi f_c t]$$

After the two up-converted components are combined into the single up-converted signal above using digital adder 118, DAC 106 samples the up-converted signal at a sample rate $f_s$ determined by a received sample clock to convert the up-converted signal from the digital domain to the analog domain. In general, the frequency at which adder 118 provides samples of the up-converted signal should be equal (or at least is typically made equal) to the sample rate $f_s$ of DAC 106. To do this, the frequency $f_r$ of the reference clock used by NCO 112 can be set equal to the sample rate $f_s$, and the sample rate of the complex digital baseband signal provided to RF digital up-converter 104 can be converted from a sample rate $f_b$ to the sample rate $f_s$ using sample rate converter 102. The sample rate $f_b$ is generally lower than the sample rate $f_s$, so sample rate converter can perform, for example, interpolation to boost the sample rate of the complex digital baseband signal up to the sample rate $f_s$. In one embodiment, interpolation is performed by zero-padding and low-pass filtering the complex digital baseband signal.

After DAC 106 converts the up-converted signal provided by adder 118 from the digital domain to the analog domain, analog filter/power amplifier 108 can filter and amplify the analog version of the up-converted signal before providing it to an antenna for transmission over the channel. Filtering can be performed to specifically remove undesired images from the up-converted signal, for example.

Although RF digital up-converter 104 can be used in the manner described above to up-convert a complex digital baseband signal to a desired RF carrier frequency, its implementation using currently available IC process geometries can consume more area and/or power than an RF analog up-converter implemented to have equivalent up-conversion functionality using the same process geometry. Most of the area and power of RF digital up-converter 104 is typically consumed by the sine/cosine look-up table in PAC 122 and digital multipliers 114 and 116 that form the complex mixer. Because of this, many transmitter back-ends push DAC 106 farther away from the antenna and perform the RF up-conversion using analog circuitry, which generally does not scale as well as digital circuitry in terms of cost and power with reductions in IC process geometries.

Figure 2:
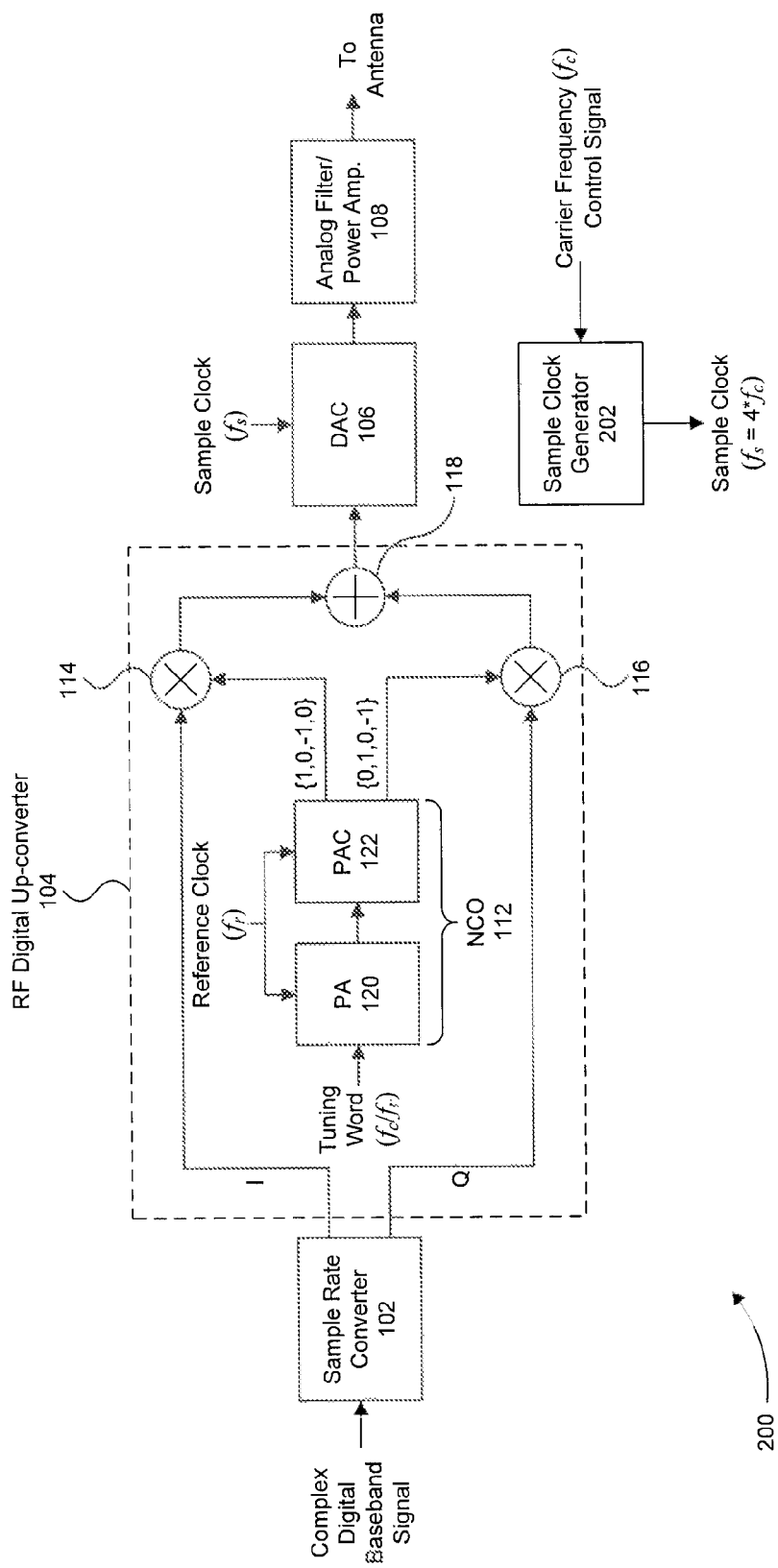
FIG. 2 illustrates a transmitter back-end with an RF digital up-converter and a sample clock generator in accordance with embodiments of the present disclosure.

Referring now to FIG. 2, another transmitter back-end 200 is illustrated in accordance with embodiments of the present disclosure. Transmitter back-end 200 is similar to transmitter back-end 100 in FIG. 1 but includes a new module: sample clock generator 202. As will be explained below, the inclusion of sample clock generator 202 can be used to simplify the implementation of RF digital up-converter 104 and, thereby, reduce its area and power consumption.

In general, sample clock generator 202 is configured to generate the sample clock used by DAC 106 to sample and convert the up-converted signal provided by digital adder 118 from the digital domain to the analog domain. Sample clock generator 202 is specifically configured to generate the sample clock such that its frequency $f_s$ is equal to four times the desired RF carrier frequency $f_c$ to which the complex digital baseband signal is to be up-converted. In one embodiment, sample clock generator 202 receives a carrier frequency control signal that indicates the currently desired RF carrier frequency $f_c$. In this embodiment, sample clock generator 202 uses this carrier frequency control signal to adjust the frequency $f_s$ of the sample clock to be four times the currently desired RF carrier frequency $f_c$, which may change over time.

By controlling the sample clock to have a frequency $f_s$ equal to four times the desired RF carrier frequency $f_c$, only (and exactly) four samples of the digital cosine and sine waves produced by NCO 112 at the RF carrier frequency $f_c$ need be output for each cycle of the two waves. This is because any other samples produced will be wasted given that DAC 106 samples at a rate equal to four times the desired RF carrier frequency $f_c$. Other samples can be produced if desired.

The four samples of the digital cosine and sine waves produced by NCO 112 for each cycle of the two waves can be chosen to be any four samples so long as they are spaced apart by successive phase advances of 90 degrees or $\pi/2$ radians. However, by selecting the four samples to be those specifically corresponding to the sequence of phase angles 0, 90, 180, and 270 degrees or, equivalently, 0, $\pi/2$, $\pi$, and $3\pi/2$ radians, the four samples produced by NCO 112 would be equal to 1, 0, −1, and 0 for the cosine wave and 0, 1, 0, and −1 for the sine wave.

Figure 3A:
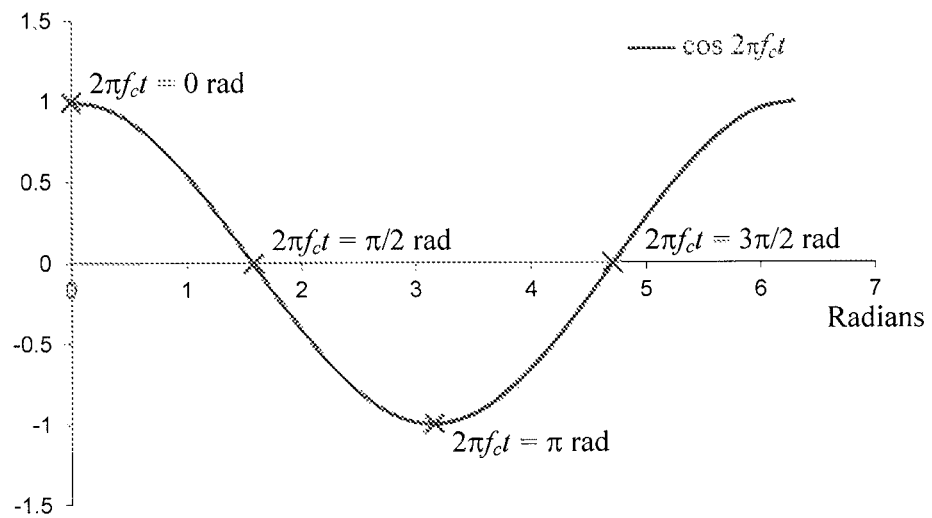
FIG. 3A illustrates one period of an example cosine wave sampled using a quarter rate sample clock.
Figure 3B:
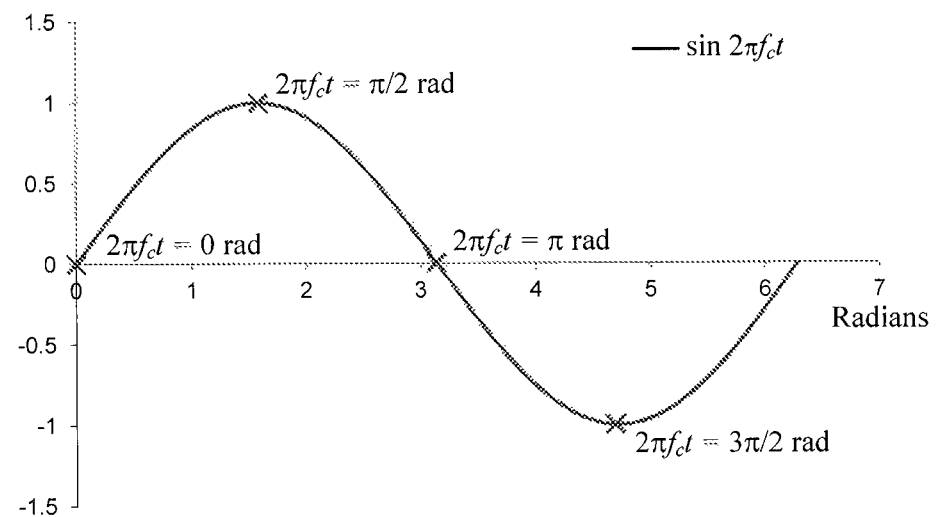
FIG. 3B illustrates one period of an example sine wave sampled using a quarter rate sample clock.

This is graphically depicted in FIG. 3A for the cosine wave and in FIG. 3B for the sine wave. From FIG. 3A, it can be seen that for the sequence of phase angles 0, $\pi/2$, $\pi$, and $3\pi/2$ radians, the four samples produced by NCO 112 for the cosine wave would be equal to the sequence 1, 0, −1, and 0. Similarly, from FIG. 3B, it can be seen that for the sequence of phase angles 0, $\pi/2$, $\pi$, and $3\pi/2$ radians, the four samples produced by NCO 112 for the sine wave would be equal to the sequence 0, 1, 0, and −1.

Because the output of NCO 112 can be reduced to a repetition of the sequence 1, 0, −1, and 0 for the cosine wave and 0, 1, 0, and −1 for the sine wave by controlling the sample clock of DAC 106 to have a sample frequency $f_s$ equal to four times the desired RF carrier frequency $f_c$, the implementation of RF digital up-converter 104 can be simplified and, thereby, its area and power consumption reduced. To better grasp the simplifications possible, it is useful to consider the output produced by RF digital up-converter 104 for each combination of corresponding values in the two sequences of samples for the sine and cosine waves. The resulting output for each such combination is provided in Table 1 below:

TABLE 1

| Sine wave sample | Cosine wave sample | Resulting output of RF digital up-converter for given sine and cosine wave samples |
|---|---|---|
| 1 | 0 | (1*I) + (0*Q) = I |
| 0 | 1 | (0*I) + (1*Q) = Q |
| −1 | 0 | (−1*I) + (0*Q) = −I |
| 0 | −1 | (0*I) + (−1*Q) = −Q |

As can be seen from Table 1, the output produced by RF digital up-converter 104 is either a current sample of the in-phase component (I) of the complex digital baseband signal being processed or its negation (i.e., −I), or a current sample of the quadrature component (Q) of the complex digital baseband signal being processed or its negation (i.e., −Q). Thus, RF digital up-converter 104 can be simplified to a negator or negators to negate incoming samples of the in-phase and quadrature components of the complex digital baseband signal and a selection module to select, as output, either the current sample of the in-phase component, the negation of the current sample of the in-phase component, the current sample of the quadrature component, or the negation of the current sample of the quadrature component.

It should be noted that other simplified implementations of RF digital up-converter 104 are possible as would be appreciated by one of ordinary skill in the art based on the teachings herein. But, in general, each such simplified implementation will typically include logic to perform a selection and negation similar to those described above to effectively perform the complex mixer multiplication and addition of the resulting values from the complex mixer multiplication. For example, in another embodiment, the selection process can be modified to have two selection phases: a first selection phase to select between the current sample of the in-phase component and the quadrature component, and a second selection phase to select between the sample provided by the first selection phase and that samples negation. In even broader terms, each such simplified implementation will effectively multiply, in a repetitive manner, samples of the in-phase component of the complex digital baseband signal by the sequence 1, 0, −1, 0 and the quadrature phase component of the complex digital base band signal by the sequence 0, 1, 0, and −1 to up-convert the complex digital baseband signal.

Figure 4:
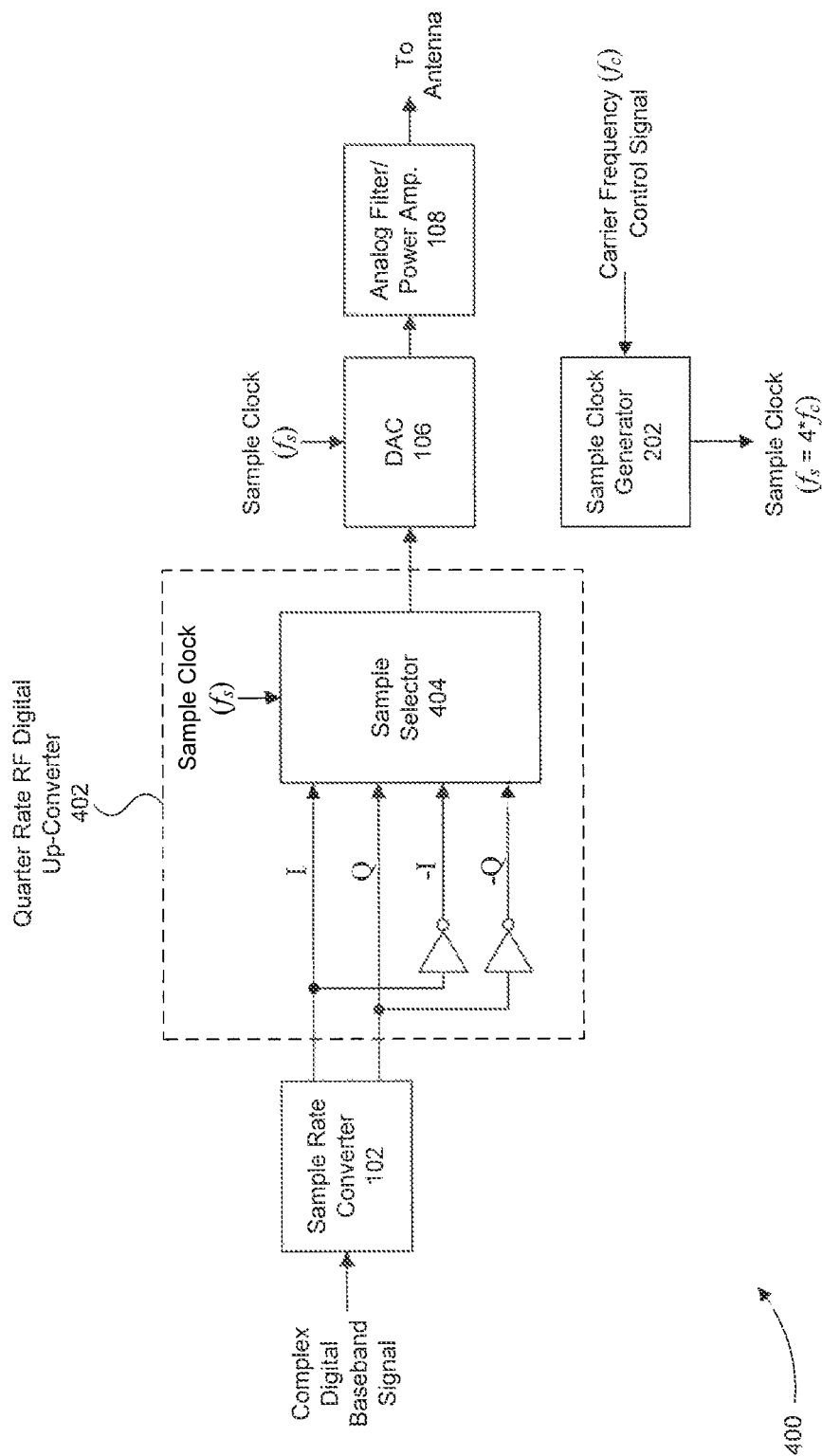
FIG. 4 illustrates a transmitter back-end with a reduced complexity quarter rate RF digital up-converter in accordance with embodiments of the present disclosure.

FIG. 4 illustrates a transmitter back-end 400 with a similar configuration as transmitter back-end 200 in FIG. 2 but with RF digital up-converter 104 replaced by an example reduced complexity RF digital up-converter 402 as described above. The reduced complexity RF digital up-converter 402 is specifically labeled as quarter rate RF digital up-converter 402 because it up-converts a complex digital baseband signal to an RF carrier frequency $f_c$ that is one quarter of the sample rate $f_s$ of DAC 106.

As shown in FIG. 4, quarter rate RF digital up-converter 402 includes two negators (represented by inverter logic gate symbols) that function to effectively multiply current samples of the in-phase and quadrature components of the complex digital baseband signal by −1 and a sample selector 404. Sample selector 404 can be configured to select, at the sample rate $f_s$, one of its four inputs to provide as output to DAC 106. Sample selector 404 is configured to specifically select its inputs in the following order I, Q, −I, −Q and repeat the same selection order thereafter. In one embodiment, sample selector 404 is implemented as a multiplexer with its selection control signal controlled in the manner described above.

It should be noted that, sample selector 404 may be able to be foregone entirely (or at least can be implemented with less inputs) where DAC 106 is composed of multiple sub-DACs that together can receive multiple digital signals in parallel and convert them to a single, analog signal.

One issue that may arise by setting the sample clock frequency $f_s$ equal to a frequency that is only four times the carrier frequency $f_c$ is that image noise from an unwanted sideband of the digital complex baseband signal may appear in a bandwidth of interest or may be too close to a bandwidth of interest in the up-converted signal to be practically filtered. It can be shown that quarter rate RF digital up-converter 402 specifically produces an image at $f_s-f_c$ or $3*f_c$ given that $f_s=4*f_c$.

Where transmitter back-end 400 is implemented in a cellular modem, for example, transmitter back-end 400 may be required to operate over a large number of cellular bands, such as bands between 700-1000 MHz and 1400-2000 MHz. For carrier frequencies in the range of 700-2000 MHz, quarter rate RF digital up-converter 402 will produce an image between 2.1-6 GHz. Such an image could present two potential problems: first it may be impractical to design an image reject filter that passes 2 GHz but rejects 2.1 GHz, and second the image may fall in another band of interest, such as the 2.4 GHz Bluetooth band and interfere with low-level signals on a system employing both cellular and Bluetooth modems.

To avoid these problems, instead of setting the sample clock frequency $f_s$ equal to a frequency that is only four times the carrier frequency $f_c$, the sample clock frequency $f_s$ can be set equal, in at least some situations, to a frequency that is eight times the carrier frequency $f_c$. With the sample frequency $f_s$ equal to eight times the carrier frequency $f_c$, it can be shown that the up-converter used will produce an image at $f_s-f_c$ or $7*f_c$ given that $f_s=8*f_c$. Continuing with the cellular modem example mentioned above, images will now be produced in the 5.6-8 GHz rage, which is generally far enough away from the band of interest in the up-converted signal (and other potential bands) to prevent interference and allow for a practical image reject filter to be implemented.

In addition to helping solve image issues, setting the sample clock frequency $f_s$ equal to a frequency that is eight times the carrier frequency $f_c$ does not require overly complex implementation changes to quarter rate RF digital up-converter 402. The changes can best be understood by again examining the RF digital up-converter 104 in FIG. 1. In that context, by controlling the sample clock to have a frequency $f_s$ equal to eight times the desired RF carrier frequency $f_c$, only (and exactly) eight samples of the digital cosine and sine waves produced by NCO 112 at the RF carrier frequency $f_c$ need be output for each cycle of the two waves. This is because any other samples produced will be wasted given that DAC 106 samples at a rate equal to eight times the desired RF carrier frequency $f_c$. Other samples can be produced if desired.

The eight samples of the digital cosine and sine waves produced by NCO 112 for each cycle of the two waves can be chosen to be any eight samples so long as they are spaced apart by successive phase advances of 45 degrees or π/4 radians. However, by selecting the eight samples to be those specifically corresponding to the sequence of phase angles 0, 45, 90, 135, 180, 225, 270, and 315 degrees or, equivalently, 0, π/4, π/2, 3π/4, π, 5π/4, 3π/2, and 7π/4 radians, the eight samples produced by NCO 112 would be equal to 1, √2/2, 0, -√2/2, -1, -√2/2, 0, and √2/2 for the cosine wave and 0, √2/2, 1, √2/2, 0, -√2/2, -1, and -√2/2 for the sine wave.

Because the output of NCO 112 can be reduced to a repetition of the sequence 1, √2/2, 0, -√2/2, -1, -√2/2, 0, and √2/2 for the cosine wave and 0, √2/2, 1, √2/2, 0, -√2/2, -1, and -√2/2 for the sine wave by controlling the sample clock of DAC 106 to have a sample frequency $f_s$ equal to eight times the desired RF carrier frequency $f_c$, the implementation of RF digital up-converter 104 can be simplified and, thereby, its area and power consumption reduced. To better grasp the simplifications possible, it is again useful to consider the output produced by RF digital up-converter 104 for each combination of corresponding values in the two sequences of samples for the sine and cosine waves. The resulting output for each such combination is provided in Table 2 below:

TABLE 2

| Sine wave sample | Cosine wave sample | Resulting output of RF digital up-converter for given sine and cosine wave samples |
|---|---|---|
| 1 | 0 | (1*I) + (0*Q) = I |
| √2/2 | √2/2 | (√2/2*I) + (√2/2*Q) = √2/2(Q + I) |
| 0 | 1 | (0*I) + (1*Q) = Q |
| -√2/2 | √2/2 | (-√2/2*I) + (√2/2*Q) = √2/2(Q - I) |
| -1 | 0 | (-1*I) + (0*Q) = -I |
| -√2/2 | -√2/2 | (-√2/2*I) + (-√2/2*Q) = -√2/2(Q + I) |
| 0 | -1 | (0*I) + (-1*Q) = -Q |
| √2/2 | -√2/2 | (√2/2*I) + (√2/2*Q) = -√2/2(Q - I) |

As can be seen from Table 2, four of the outputs produced are identical to those produced by quarter rate RF digital up-converter 402; i.e., the outputs I, Q, -I, and -Q. Thus, these four outputs can be generated in a similar manner as described above. The other four outputs can be produced, for example, using two adders that respectively form the sums (Q+I) and (Q-I), two multipliers that each respectively multiply one of the two formed sums by √2/2 to respectively form two of the four outputs √2/2(Q+I) and √2/2(Q-I), and two negators that each respectively negate one of the two already formed outputs to produce the remaining two -√2/2(Q+I) and -√2/2(Q-I).

Figure 5:
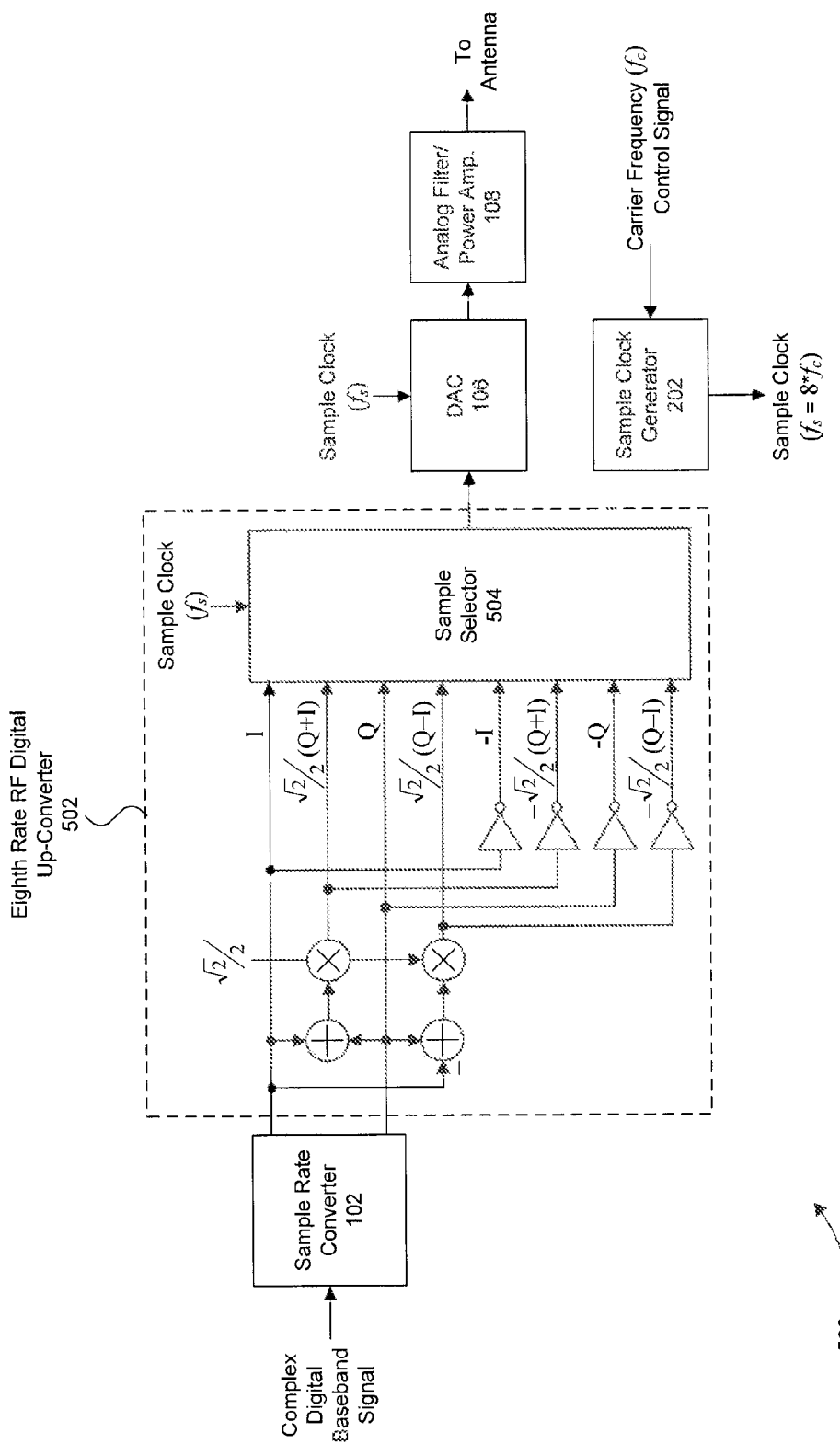
FIG. 5 illustrates a transmitter back-end with a reduced complexity eighth rate RF digital up-converter in accordance with embodiments of the present disclosure.

FIG. 5 illustrates a transmitter back-end 500 with a similar configuration as transmitter back-end 200 in FIG. 2 but with RF digital up-converter 104 replaced by a reduced complexity RF digital up-converter 502 as described above. The reduced complexity RF digital up-converter 502 is specifically labeled as eighth rate RF digital up-converter 502 because it up-converts a complex digital baseband signal to an RF carrier frequency $f_c$ that is one eighth the sample rate $f_s$ of DAC 106. Eighth rate RF digital up-converter 502 produces the eight outputs provided in Table 2 in the manner described above, using two adders, two multipliers, and four negators.

Sample selector 504 is configured to select, at the sample rate $f_s$, one of its eight inputs to provide as output to DAC 106. Sample selector 504 can be configured to specifically select, at the sample rate $f_s$ for example, its inputs in the following order I, √2/2(Q+I), Q, √2/2(Q-I), -I, -√2/2(Q+I), -Q, -√2/2(Q-I) and repeat the same selection order thereafter. In one embodiment, sample selector 504 is implemented as a multiplexer with its selection control signal controlled in the manner described above.

Because eighth rate RF digital up-converter 502 produces the four outputs for quarter rate RF digital up-converter 402, in other embodiments eighth rate RF digital up-converter 502 can be configured to switch from an eighth rate RF digital up-converter to a quarter rate RF digital up-converter. While operating as a quarter rate RF digital up-converter, sample selector 504 would only select from the inputs I, Q, -I, and -Q. In addition, sample clock generator 202 would generate the sample clock with a frequency $f_s$ that is four times the RF carrier frequency $f_c$, as opposed to eight times the RF carrier frequency $f_c$. An additional control signal (not shown) can be fed to eighth rate RF digital up-converter 502 and sample clock generator 202 to switch between the quarter and eighth rate modes of operation. In general, transmitter back-end 500 can be controlled to operate in the eighth rate mode of operation when necessary to prevent anticipated image issues as discussed above and in the quarter rate mode in other times to conserve power, for example.

It should be noted that other implementations of eighth rate RF digital up-converter 502 are possible as would be appreciated by one of ordinary skill in the art based on the teachings herein. But, in general, each such simplified implementation will typically include logic to perform selection, negation(s), and multiplication(s) similar to those described above to effectively perform the complex mixer multiplication and addition of the resulting values from the complex mixer multiplication. In even broader terms, each such simplified implementation will effectively multiply, in a repetitive manner, samples of the in-phase component of the complex digital baseband signal by the sequence 1, $\sqrt{2}/2$, 0, $-\sqrt{2}/2$, $-1$, $-\sqrt{2}/2$, 0, and $\sqrt{2}/2$ and the quadrature phase component of the complex digital base band signal by the sequence 0, $\sqrt{2}/2$, 1, $\sqrt{2}/2$, 0, $-\sqrt{2}/2$, $-1$, and $-\sqrt{2}/2$ to up-convert the complex digital baseband signal.

For example, in another implementation, the actual calculation of the eight different possible outputs by eighth rate RF digital up-converter 502 can be performed at a digital clock rate below the sampling frequency $f_s$ using an additional sample rate converter that follows after these outputs are calculated but before sample selector 504 as would be appreciated by one of ordinary skill in the art. An example of such an implementation is explicitly described and shown in FIG. 3 of U.S. Provisional Patent Application No. 61/909,055, filed Nov. 26, 2013, to which this application claims priority to and incorporates by reference. Performing the calculation of the eight different possible outputs at a rate below the sampling frequency $f_s$ can save power or ease timing requirements because, for example, the multipliers used to multiply incoming samples of the complex digital baseband signal can be run at a slower speed. Also, sample selector 504 may be able to be foregone entirely (or at least can be implemented with less inputs) where DAC 106 is composed of multiple sub-DACs that together can receive multiple digital signals in parallel and convert them to a single, analog signal.

Figure 6:
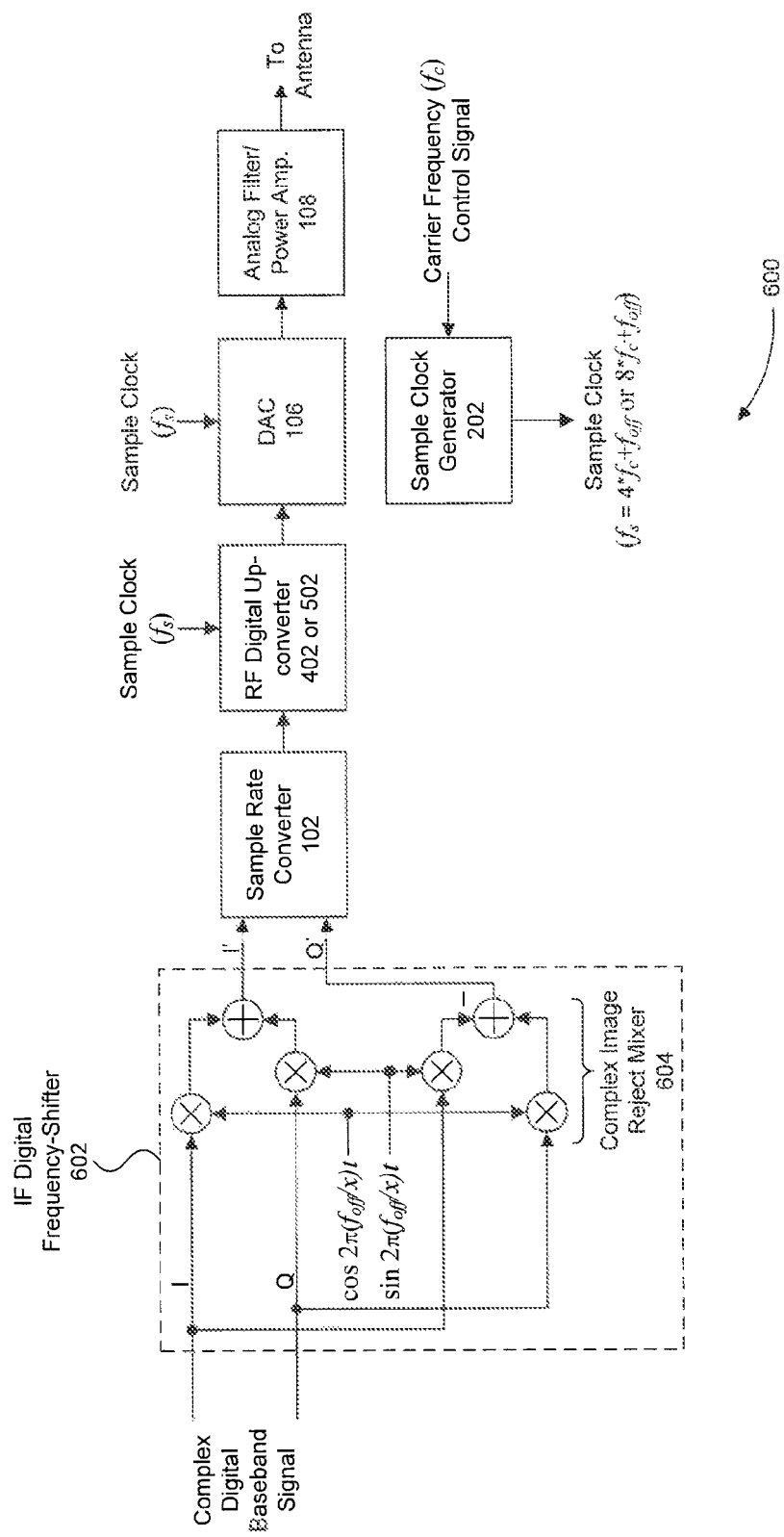
FIG. 6 illustrates a transmitter back-end with a quarter and/or eighth rate RF digital up-converter and an IF digital up-converter for performing an offset correction in accordance with embodiments of the present disclosure.

Referring now to FIG. 6, a transmitter back-end 600 with the same structure as either transmitter back-end 400 in FIG. 4 or 500 in FIG. 5 is illustrated in accordance with embodiments of the present disclosure. The difference between transmitter back-end 600 and those disclosed in FIGS. 4 and 5 is that transmitter back-end 600 includes an intermediate frequency (IF) digital frequency shifter 602. This additional module can be used to correct a potential issue with transmitter back-ends 400 and 500.

In particular, sample clock generator 202 may not be able to (or it may not be desired to) generate the sample clock at a frequency $f_s$ that is close enough to exactly four or eight times the carrier frequency $f_c$ for proper operation. For example, sample clock generator 202 can be implemented using a phase-locked loop (PLL) that can only tune the frequency $f_s$ of the sample clock to be some multiple of a 26 MHz crystal reference clock or a multiple of some other coarse reference clock. In addition, the reference clock may not be accurate due to, for example, drift over time or other sources of error.

As a result, the sample clock generated by sample clock generator 202 may not have a frequency $f_s$ that is close enough to exactly four or eight times the carrier frequency $f_c$ for proper operation. The offset in the frequency $f_s$ of the sample clock can be denoted by a frequency $f_{off}$, and $f_{off}$ effectively translates to a frequency offset in the carrier frequency $f_c$ equal to $f_{off}/8$, in the eighth rate mode, and $f_{off}/4$ in the quarter rate mode. IF digital frequency-shifter 602 can be used to pre-compensate for this effective frequency offset in the carrier frequency $f_c$. More specifically, as shown in FIG. 6, IF digital frequency-shifter 602 can pre-mix the in-phase (I) and quadrature (Q) components of the complex digital baseband signal with cosine and sine waves that have a frequency equal to $-f_{off}/8$ in the eighth rate mode and $-f_{off}/4$ in the quarter rate mode using a complex image reject mixer 604 (or some other mixer), for example. The compensated version (or IF version) of the in-phase and quadrature components, labeled as I' and Q' in FIG. 6, can then be provided to sample rate converter 102. The compensated version I' and Q' are respectively translated in frequency, relative to I and Q, by $-f_{off}/8$ in the eighth rate mode and $-f_{off}/4$ in the quarter rate mode. Because IF digital up-converter can operate at a much lower speed than the RF digital up-converter 402 or 502, its power consumption can be relatively small.

It should be noted that the cosine and sine waves used by IF digital frequency-shifter 602 can be generated, for example, using an NCO similar to the one described above in FIG. 1, and are shown as having a frequency equal to $f_{off}/x$ for exemplary purposes in FIG. 6, where x is a variable. Also, it should be noted that a key design consideration to this split rate digital up-conversion approach is that the frequency offset applied by IF digital frequency-shifter 602 increases the bandwidth of the baseband signal and, as a result, should be small enough to not overly complicate sample rate converter 102, which now must convert the sample rate of the higher bandwidth IF signal.

Figure 7:
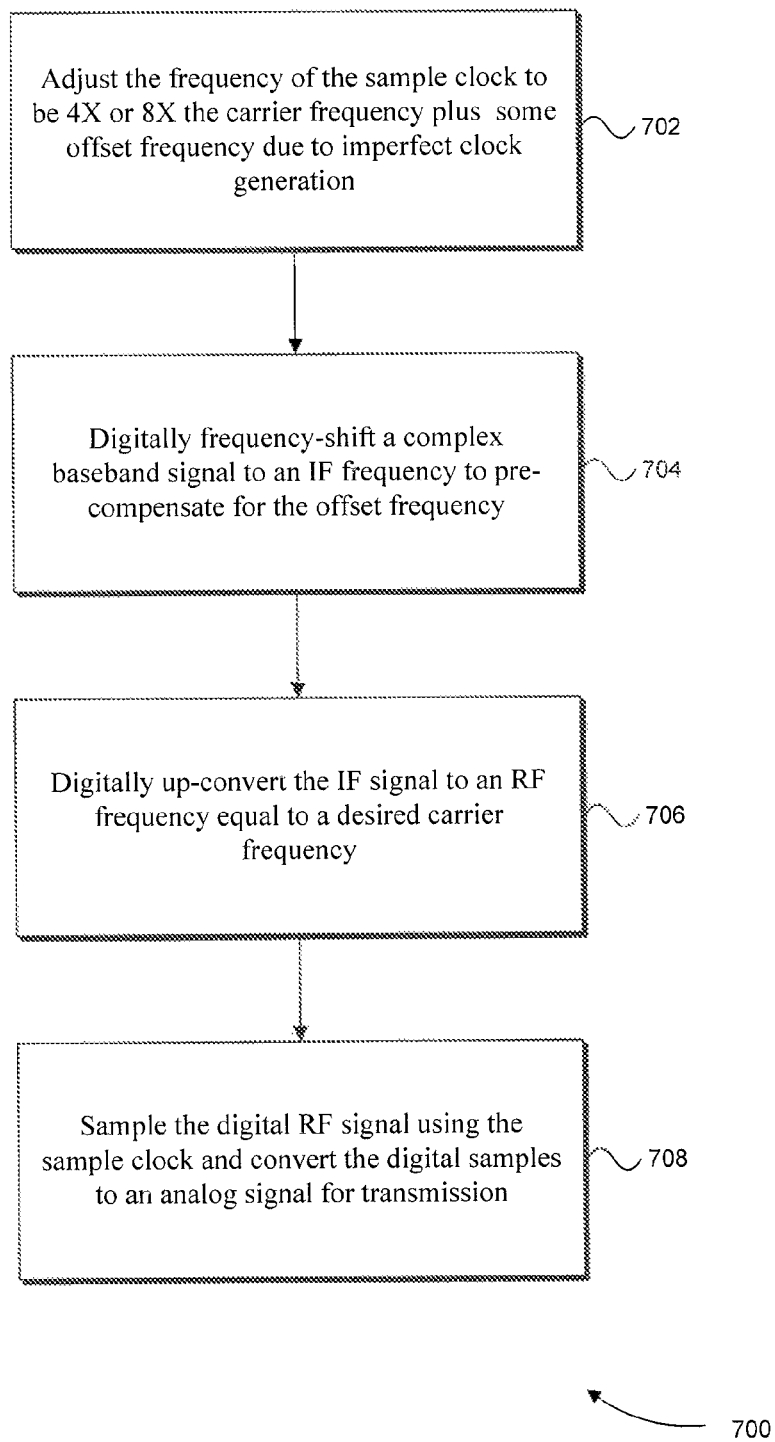
FIG. 7 illustrates a flowchart of an example method for performing quarter and/or eighth rate RF digital up-conversion in accordance with embodiments of the present disclosure.

Referring now to FIG. 7, a flowchart 700 of an example method for performing quarter and/or eighth rate RF digital up-conversion in accordance with embodiments of the present disclosure is illustrated. The method of flowchart 700 can be implemented by transmitter back-end 600 described above in FIG. 6. However, it should be noted that the method can be implemented by other devices as well.

The method of flowchart 700 begins at step 702. At step 702, the sample clock is adjusted to be four or eight times the carrier frequency plus some offset frequency due to imperfect generation of the sample clock.

At step 704, the complex digital baseband signal is digitally frequency shifted to an IF frequency to pre-compensate for the offset frequency.

At step 706, the digitally frequency shifted IF signal (or alternatively the pre-compensated complex digital baseband signal) is digitally up-converted to the desired RF carrier frequency. The implementation of the RF digital up-converter used can be similar to the implementation shown in FIGS. 4 and 5.

It should be noted that, in other embodiments of the system and method of the present disclosure, the sample clock used by DAC 106 in FIGS. 4 and 5 can be generated by sample clock generator 202 such that the ratio of the frequency of the sample clock $f_s$ to the RF carrier frequency $f_c$ is equal to some value other than 4 or 8 (as used in the examples above), while still allowing for the same or similar reduced complexity RF digital up-converters as described above to be used.

For example, the sample clock used by DAC 106 in FIG. 5 can be generated by sample clock generator 202 such that the ratio of the sample clock frequency $f_s$ to the RF carrier frequency $f_c$ is equal to a value of 8/3, as opposed to 8, while still allowing for the same simplifications to the RF digital up-converter as described above in regard to FIG. 5. By controlling the sample clock to have a frequency $f_s$ equal to 8/3 times the desired RF carrier frequency $f_c$, only (and exactly) 8 samples of the digital cosine and sine waves at the RF carrier frequency $f_c$ need be output for every three cycles of the two waves. This is because any other samples produced will be wasted given that DAC 106 samples at a rate equal to 8/3 times the desired RF carrier frequency $f_c$. Other samples can be produced if desired.

The 8 samples of the digital cosine and sine waves produced for every 3 cycles of the two waves can be chosen to be any 8 samples so long as they are spaced apart by successive phase advances of 135 degrees (i.e., 3/8*360 degrees) or $3\pi/4$ radians. However, by selecting the 8 samples to be those specifically corresponding to the sequence of phase angles 0, 135, 270, 45, 180, 315, 90, and 225 degrees or, equivalently, 0, $2\pi/3$, $3\pi/2$, $\pi/4$, $\pi$, $5\pi/3$, $\pi/2$, and $5\pi/4$ radians, the eight samples produced would be equal to 1, $-\sqrt{2}/2$, 0, $\sqrt{2}/2$, $-1$, $\sqrt{2}/2$, 0, $-\sqrt{2}/2$ for the cosine wave and 0, $\sqrt{2}/2$, $-1$, $\sqrt{2}/2$, 0, $-\sqrt{2}/2$, 1, $-\sqrt{2}/2$ for the sine wave. The above sets of samples have the exact same samples as those discussed above for eighth rate RF digital up-converter 502 shown in FIG. 5, but the samples are in a different order. Thus, eighth rate RF digital up-converter 502 can be used in the example where sample clock generator 202 generates the sample clock such that the ratio of $f_s/f_c$ is equal to 8/3. The only (or at least one) change needed would be to the order in which sample selector 504 selects its inputs or, alternatively, the order in which the inputs are fed into sample selector 504.

In general, in order to take advantage of the reduced complexity configuration of quarter rate RF digital up-converter 402, the ratio $f_s/f_c$ can be set to a value other than four so long as that value results in a phase step between samples of the digital cosine and sine waves used for mixing that is a sub-multiple of 90 degrees (e.g., 90, 45, 30, 22.5, 15, 11.25, and 7.5 degrees) or a multiple of a sub-multiple of 90 degrees that is less than 180 degrees and not a sub-multiple of 360 degrees (e.g., the third multiple of 45 degrees or 135 degrees, which is less than 180 degrees and not a sub-multiple of 360 degrees). For a given ratio $f_s/f_c$, the corresponding phase step between samples of the digital cosine and sine waves used for mixing can be determined by multiplying the reciprocal of the ratio $f_s/f_c$ by 360 degrees.

For example, for a ratio $f_s/f_c=12/5$, the corresponding phase step between samples of the digital cosine and sine waves used for mixing is equal to (5/12)*360 degrees or 150 degrees. This 150 degree phase step meets the above criteria of being a multiple of a sub-multiple of 90 degrees (e.g., the fifth multiple of 30 degrees) that is less than 180 degrees and not a sub-multiple of 360 degrees. The reduced complexity mixer would implement 12 possible phase steps at 30 degrees, so that the mixer can visit all possible phases of 150 degree steps (i.e. 150 degrees, 300 degrees, 450 degrees (or 90 degrees)), etc. Thus, the ratio $f_s/f_c=12/5$ can be used, while still taking advantage of the same reduced complexity configuration as quarter rate RF digital up-converter 402 in FIG. 4, albeit with some additional hardware/logic as would be appreciated by one of ordinary skill in the art.

Similarly, in order to take advantage of the reduced complexity configuration of eighth rate RF digital up-converter 502, the ratio $f_s/f_c$ can be set to a value other than four so long as that value results in a phase step between samples of the digital cosine and sine waves used for mixing that is a sub-multiple of 45 degrees (e.g., 45, 30, 22.5, 15, 11.25, and 7.5 degrees) or a multiple of a sub-multiple of 45 degrees that is less than 180 degrees and not a sub-multiple of 360 degrees (e.g., the third multiple of 45 degrees or 135 degrees, which is less than 180 degrees and not a sub-multiple of 360 degrees). Again, for a given ratio $f_s/f_c$, the corresponding phase step between samples of the digital cosine and sine waves used for mixing can be determined by multiplying the reciprocal of the ratio $f_s/f_c$ by 360 degrees.

Finally, it should be noted that transmitter back-ends 400, 500, and 600 can be used within a wide range of devices, including transmitters for cellular applications, wireless local area network applications, and Bluetooth applications. It should also be noted that transmitter back-ends 400, 500, and 600 can be used in transmitters configured to transmit over wireless and/or wired mediums.

III. SPLIT RATE DIGITAL UP-CONVERSION

Referring back to FIG. 1, the issue with RF digital up-converter 104 mentioned above is that its implementation using currently available IC process geometries can consume more area and/or power than an RF analog up-converter implemented to have equivalent up-conversion functionality using the same process geometry. In particular, a lot of area and power of the RF digital up-converter 104 can be consumed by the sine/cosine look-up table in phase-to-amplitude converter (PAC) 122 of numerically controlled oscillator (NCO) 112.

As explained above, NCO 112 is configured to generate digital cosine and sine waves at the desired carrier frequency $f_c$ for mixing with the complex digital baseband signal. NCO 112 is configured to generate the digital cosine and sine waves using a phase accumulator (PA) 120 and PAC 122. PA 120 typically includes a counter that is incremented with each cycle of a reference clock (or based on a reference clock) by an amount determined by a tuning word. The value of the counter represents a phase angle and is used to index into a cosine/sine look-up table in PAC 122. In response to receiving the counter value, the cosine/sine look-up table in PAC 122 outputs two digital amplitudes that respectively correspond to the cosine and sine of the phase angle represented by the received counter value. By setting the tuning word equal to $f_c/f_r$ (or a multiple thereof depending on the modulus of the counter in PA 120), where $f_r$ is the frequency of the reference clock, it can be shown that the output of PAC 122 will correspond to samples of the digital cosine and sine wave at the desired frequency $f_c$. The samples of the digital cosine and sine wave are typically provided by PAC 122 at the reference clock frequency $f_r$.

The sine/cosine look-up table in PAC 122 generally consumes a lot of area and power because the sine/cosine look-up table typically includes a large number of entries, where an entry corresponds to the digital amplitude of a sine or cosine wave at a particular phase angle. Thus, to reduce the area and power consumption of PAC 122, the number of entries in the sine/cosine look-up table can be reduced. But such a reduction is not without cost. The number of entries in the sine/cosine look-up table of PAC 122 generally determines the frequency resolution of NCO 112 (i.e., the resolution at which it can generate a sine or cosine wave at a particular frequency) for a given reference clock frequency $f_r$. The better the resolution of NCO 112, the closer NCO 112 can generate the sine and cosine waves at the desired carrier frequency $f_c$.

Figure 8:
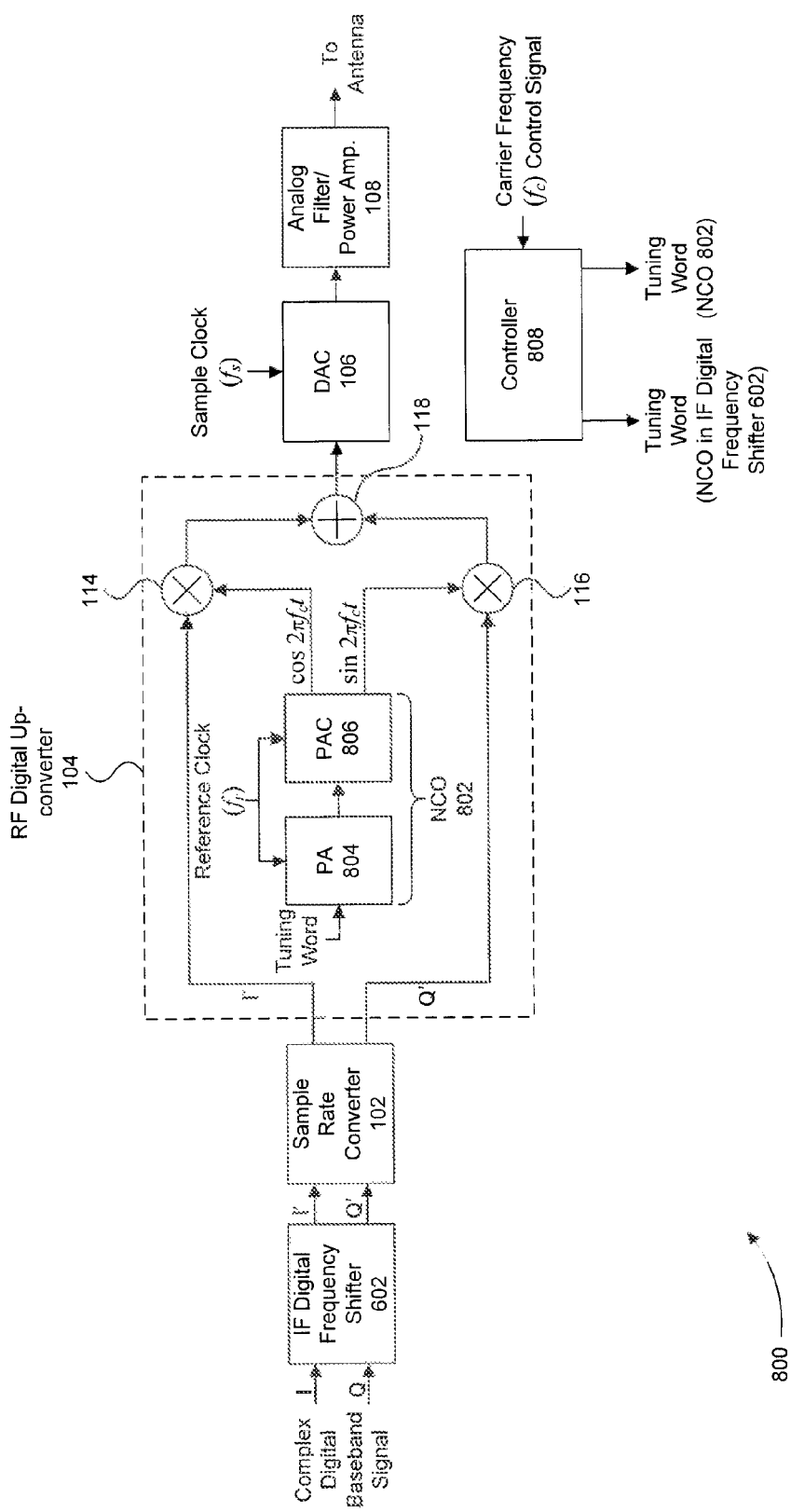
FIG. 8 illustrates a transmitter back-end with an RF digital up-converter and an IF digital up-converter for performing an offset correction in accordance with embodiments of the present disclosure.

Referring now to FIG. 8, a transmitter back-end 800 with a similar structure as transmitter back-end 100 in FIG. 1 is illustrated in accordance with embodiments of the present disclosure. Differences between transmitter back-end 800 and transmitter back-end 100 in FIG. 1 include the addition of an intermediate frequency (IF) digital frequency shifter 602, an NCO 802 with a reduced number of entries in the sine/cosine look-up table of its phase-to-amplitude converter (PAC) 806 to limit its area and power consumption, and a controller 808. IF digital frequency shifter 602, described above in FIG. 6, can be used to correct for an offset in the frequency of the sine and cosine waves generated by NCO 802 from a desired carrier frequency $f_c$ due to the number of entries in the sine/cosine look-up table of PAC 806 being reduced.

For example, the sine/cosine look-up table of PAC 806 can be implemented to include 32 entries, with each entry corresponding to the amplitude of a sine or cosine wave at 1 of 32 different evenly spaced phase angles between 0 and 360 degrees. With 32 such entries, NCO 112 has a frequency resolution of $f_r/32$ Hz and can generate the sine and cosine waves at a frequency that is within $+/-[(f_r/32)/2]$ Hz of a desired carrier frequency $f_c$. Thus, IF digital frequency shifter 602 can pre-compensate for a resulting offset due to the limited frequency resolution of NCO 112.

More specifically, as shown in FIG. 6, IF digital frequency-shifter 602 can pre-mix the in-phase (I) and quadrature (Q) components of the complex digital baseband signal with cosine and sine waves that have a frequency equal to $f_{off}$, where $f_{off}$ in the context of FIG. 8 is equal to the frequency offset of the cosine and sine waves generated by NCO 112 from the desired carrier frequency $f_c$ (or is at least determined based on this frequency offset). The compensated version (or IF version) of the in-phase and quadrature components, labeled as I' and Q' in FIG. 6 and FIG. 8, can then be provided to sample rate converter 102. Because IF digital frequency-shifter 602 can operate at a much lower speed than the RF digital up-converter 104 in FIG. 8, its power consumption can be relatively small.

It should be noted that the cosine and sine waves used by IF digital frequency-shifter 602 can be generated, for example, using an NCO similar to the one described above in FIG. 1, and are shown as having a frequency equal to $f_{off}/x$ for exemplary purposes in FIG. 6, where x is a variable. Also, it should be noted that a key design consideration to this split rate digital up-conversion approach is that the frequency offset applied by IF digital frequency-shifter 602 increases the bandwidth of the baseband signal and, as a result, should be small enough to not overly complicate sample rate converter 102, which now must convert the sample rate of the higher bandwidth IF signal.

Controller 808 can be used to generate the tuning words for NCO 802 and the NCO used by IF digital frequency shifter 602 to generate the cosine and sine waves that have a frequency equal to $f_{off}$ as explained above. Controller 808 can specifically generate the two tuning words based on the desired carrier frequency $f_c$, received as an input by controller 808. For example, assuming that NCO 112 includes 32 entries as provided in the above example, and that the reference clock has a frequency $f_r$=5 GHz and a carrier frequency $f_c$=700 MHz is desired, controller 808 can be configured to determine the tuning word to use for NCO 802 that will result in NCO 802 generating its cosine and sine waves with a frequency as close as possible to the desired carrier frequency $f_c$=700 MHz. In the given example, controller 808 would determine the tuning word for NCO 802 such that the 32 entries in PAC 806 are stepped through in increments of 4. At such an increment, the output frequency of the sine and cosine wave generate by NCO 802 will be $(4/32)*f_r$, or $(4/32)*5$ GHz, which equals 625 MHz.

After determining the tuning word for NCO 802, controller 808 can then determine the tuning word for the NCO of IF digital frequency shifter 602 to generate the cosine and sine waves used by IF digital frequency shifter 602 to have a frequency equal to $f_{off}$ as explained above, which in this case would be equal to 700 MHz-625 MHz or 75 MHz.

It should be noted that transmitter back-end 800 can be used within a wide range of devices, including transmitters for cellular applications, wireless local area network applications, and Bluetooth applications. It should also be noted that transmitter back-end 800 can be used in transmitters configured to transmit over wireless and/or wired mediums.

IV. EXAMPLE COMPUTER SYSTEM ENVIRONMENT

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 9:
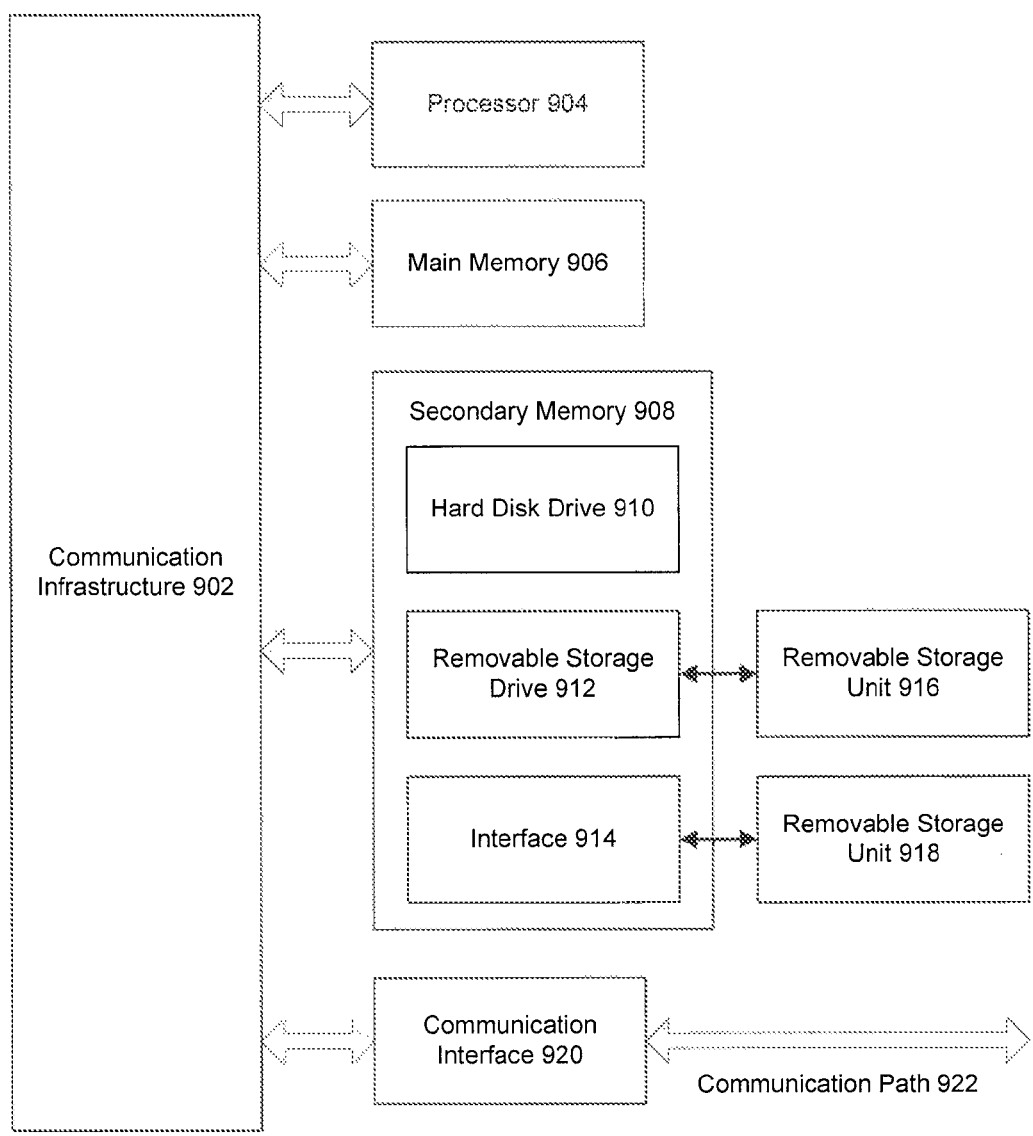
FIG. 9 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 900 is shown in FIG. 9. Modules depicted in FIGS. 4-6 and 8 may execute on one or more computer systems 900. Furthermore, each of the steps of the method depicted in FIG. 7 can be implemented on one or more computer systems 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCM-CIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

V. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A transmitter comprising:
    a sample clock generator configured to generate a sample clock to have a frequency that is 4, 8, or 8/3 times a carrier frequency plus an offset frequency;
    an intermediate frequency (IF) digital frequency-shifter configured to frequency-shift a baseband signal by the offset frequency divided by 4, 8, or 8/3 to provide an IF signal;
    a radio frequency (RF) digital up-converter configured to up-convert the IF signal to provide a digital RF signal at the carrier frequency; and
    a digital-to-analog converter (DAC) configured to sample the digital RF signal using the sample clock and convert the samples of the digital RF signal to an analog RF signal for transmission over a channel.

2. The transmitter of claim 1, wherein the RF digital up-converter is configured to up-convert the IF signal to provide the digital RF signal at the carrier frequency by effectively multiplying an in-phase component of the IF signal by the sequence $\{1, 0, -1, 0\}$ and a quadrature component of the IF signal by the sequence $\{0, 1, 0, -1\}$.

3. The transmitter of claim 1, wherein the RF digital up-converter is configured to up-convert the IF signal to provide the digital RF signal at the carrier frequency by effectively multiplying an in-phase component of the IF signal by the sequence $\{1, \sqrt{2}/2, 0, -\sqrt{2}/2, -1, -\sqrt{2}/2, 0, \text{and } \sqrt{2}/2\}$ and a quadrature component of the IF signal by the sequence $\{0, \sqrt{2}/2, 1, \sqrt{2}/2, 0, -\sqrt{2}/2, -1, -\sqrt{2}/2,\}$.

4. The transmitter of claim 1, wherein the RF digital up-converter is configured to up-convert the IF signal to provide the digital RF signal at the carrier frequency by effectively multiplying an in-phase component of the IF signal by the sequence $\{1, -\sqrt{2}/2, 0, \sqrt{2}/2, -1, \sqrt{2}/2, 0, -\sqrt{2}/2\}$ and a quadrature component of the IF signal by the sequence $\{0, \sqrt{2}/2, -1, \sqrt{2}/2, 0, -\sqrt{2}/2, 1, -\sqrt{2}/2\}$.

5. The transmitter of claim 1, wherein the sample clock generator is configured to generate the sample clock to have a frequency that is either 4 or 8 times the carrier frequency based on anticipated image noise from an unwanted sideband of the baseband signal.

6. The transmitter of claim 1, wherein the RF digital up-converter comprises a multiplexer configured to select between a sample of a first component of the IF signal, a negated version of the sample of the first component of the IF signal, a sample of a second component of the IF signal, or a negated version of the sample of the second component of the IF signal to provide a sample of the digital RF signal at the carrier frequency.

7. The transmitter of claim 1, further comprising a sample rate converter configured to convert a sample rate of the IF signal to match the frequency of the sample clock.

8. A transmitter comprising:
    a sample clock generator configured to generate a sample clock to have a frequency that is 4, 8, or 8/3 times a carrier frequency;
    a radio frequency (RF) digital up-converter configured to up-convert an intermediate frequency (IF) signal to provide a digital RF signal at the carrier frequency, wherein the IF signal is generated by up-converting a baseband signal to pre-compensate for an offset in the sample clock; and a digital-to-analog converter (DAC) configured to sample the digital RF signal using the sample clock and convert the samples of the digital RF signal to an analog RF signal for transmission over a channel.

9. The transmitter of claim 8, wherein the RF digital up-converter is configured to up-convert the IF signal to provide the digital RF signal at the carrier frequency by effectively multiplying an in-phase component of the IF signal by the sequence $\{1, 0, -1, 0\}$ and a quadrature component of the IF signal by the sequence $\{0, 1, 0, -1\}$.

10. The transmitter of claim 8, wherein the RF digital up-converter is configured to up-convert the IF signal to provide the digital RF signal at the carrier frequency by effectively multiplying an in-phase component of the baseband or IF signal by the sequence $\{1, \sqrt{2}/2, 0, -\sqrt{2}/2, -1, -\sqrt{2}/2, 0, $ and $\sqrt{2}/2\}$ and a quadrature component of the IF signal by the sequence $\{0, \sqrt{2}/2, 1, \sqrt{2}/2, 0, -\sqrt{2}/2, -1, \sqrt{2}/2,\}$.

11. The transmitter of claim 8, wherein the RF digital up-converter is configured to up-convert the IF signal to provide the digital RF signal at the carrier frequency by effectively multiplying an in-phase component of the IF signal by the sequence $\{1, -\sqrt{2}/2, 0, \sqrt{2}/2, -1, \sqrt{2}/2, 0, -\sqrt{2}/2\}$ and a quadrature component of the IF signal by the sequence $\{0, \sqrt{2}/2, -1, -\sqrt{2}/2, 0, -\sqrt{2}/2, 1, -\sqrt{2}/2\}$.

12. The transmitter of claim 8, wherein the sample clock generator is configured to generate the sample clock to have a frequency that is either 4 or 8 times the carrier frequency based on anticipated image noise from an unwanted sideband of the baseband signal.

13. The transmitter of claim 8, wherein the RF digital up-converter comprises a multiplexer configured to select between a sample of a first component of the or IF signal, a negated version of the sample of the first component of the IF signal, a sample of a second component of the IF signal, or a negated version of the sample of the second component of the IF signal to provide a sample of the digital RF signal at the carrier frequency.

14. The transmitter of claim 8, further comprising a sample rate converter configured to convert a sample rate of the IF signal to match the frequency of the sample clock.

15. A transmitter comprising:
a sample clock generator configured to generate a sample clock to have a frequency that is N times a carrier frequency, wherein the reciprocal value of N times 360 degrees is a sub-multiple of 90 degrees or is a multiple of a sub-multiple of 90 degrees that is less than 180 degrees and not a sub-multiple of 360 degrees, and wherein N is not equal to 4 or 8;
a radio frequency (RF) digital up-converter configured to up-convert an intermediate frequency (IF) signal to provide a digital RF signal at the carrier frequency, wherein the IF signal is generated by up-converting a baseband signal to pre-compensate for an offset in the sample clock; and
a digital-to-analog converter (DAC) configured to sample the digital RF signal using the sample clock and convert the samples of the digital RF signal to an analog RF signal for transmission over a channel.

16. The transmitter of claim 15, wherein the RF digital up-converter is configured to up-convert the IF signal to provide the digital RF signal at the carrier frequency by effectively multiplying an in-phase component of the IF signal by the sequence $\{1, 0, -1, 0\}$ and a quadrature component of the IF signal by the sequence $\{0, 1, 0, -1\}$.

17. The transmitter of claim 15, wherein the RF digital up-converter is configured to up-convert the IF signal to provide the digital RF signal at the carrier frequency by effectively multiplying an in-phase component of the IF signal by the sequence $\{1, \sqrt{2}/2, 0, -\sqrt{2}/2, -1, -\sqrt{2}/2, 0, $ and $\sqrt{2}/2\}$ and a quadrature component of the IF signal by the sequence $\{0, \sqrt{2}/2, 1, \sqrt{2}/2, 0, -\sqrt{2}/2, -1, -\sqrt{2}/2,\}$.

18. The transmitter of claim 15, wherein the RF digital up-converter is configured to up-convert the IF signal to provide the digital RF signal at the carrier frequency by effectively multiplying an in-phase component of the IF signal by the sequence $\{1, -\sqrt{2}/2, 0, \sqrt{2}/2, -1, \sqrt{2}/2, 0, -\sqrt{2}/2\}$ and a quadrature component of the IF signal by the sequence $\{0, \sqrt{2}/2, -1, \sqrt{2}/2, 0, -\sqrt{2}/2, 1, -\sqrt{2}/2\}$.

19. The transmitter of claim 15, wherein the sample clock generator is configured to generate the sample clock to have a frequency that is determined based on anticipated image noise from an unwanted sideband of the baseband signal.

20. The transmitter of claim 15, wherein the RF digital up-converter comprises a multiplexer configured to select between a sample of a first component of the IF signal, a negated version of the sample of the first component of the IF signal, a sample of a second component of the IF signal, or a negated version of the sample of the second component of the IF signal to provide a sample of the digital RF signal at the carrier frequency.

\* \* \* \* \*

UNITED STATES PATENT AND TRADEMARK OFFICE
CERTIFICATE OF CORRECTION

PATENT NO. : 9,634,694 B2  
APPLICATION NO. : 14/163783  
DATED : April 25, 2017  
INVENTOR(S) : Harris et al.

Page 1 of 1

It is certified that error appears in the above-identified patent and that said Letters Patent is hereby corrected as shown below:

On the Title Page

Item (71), replace "Irvine, CA (US)" with --Singapore (SG)--.

In the Claims

In Column 17, Lines 14-15, replace "the baseband or IF" with --the IF--.

In Column 17, Line 25, replace "$\{0, \sqrt{2}/2, -1, -\sqrt{2}/2\}$" with --$\{0, \sqrt{2}/2, -1, \sqrt{2}/2$--.

In Column 17, Line 33, replace "the or IF" with --the IF--.

Signed and Sealed this  
Twenty-fifth Day of June, 2019

Andrei Iancu  
*Director of the United States Patent and Trademark Office*